United States Patent Office 3,773,953
Patented Nov. 20, 1973

3,773,953
METHODS FOR RELIEVING PAIN
David B. Reisner, Highstown, Bernard J. Ludwig, North Brunswick, Frank M. Berger, Princeton, and Robert D. Sofia, Willingboro, N.J., assignors to Carter-Wallace, Inc., New York, N.Y.
No Drawing. Continuation-in-part of application Ser. No. 79,311, Oct. 8, 1970, now Patent No. 3,681,350, dated Aug. 1, 1972. This application July 21, 1972, Ser. No. 273,923
Int. Cl. A61k 27/00
U.S. Cl. 424—251        4 Claims

ABSTRACT OF THE DISCLOSURE

Chemical compounds of the formula:

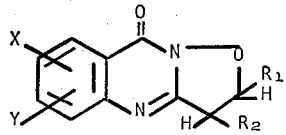

in which X and Y, which may be the same or different, each represent a member selected from the group consisting of hydrogen, hydroxy, halogen, lower alkyl, lower alkoxy or sulfonamido and $R_1$ and $R_2$, which may be the same or different, represent hydrogen or lower alkyl. Said compounds have demonstrated valuable analgesic properties in standard laboratory animals.

---

This application is a continuation-in-part of application Ser. No. 79,311, filed Oct. 8, 1970, now U.S. Pat. 3,681,350, issued Aug. 1, 1972.

The present invention relates to novel quinazolinone compounds. More particularly the invention relates to 2,3-dihydro - 9H - isoxazolo(3,2-b) quinazolin-9-one as well as substituted 2,3-dihydro-9H-isoxazolo(3,2-b)quinazolin-9-ones which possess useful pharmacological properties.

The compounds of this invention possess valuable therapeutic activities which render them useful as analgesic agents.

It is accordingly an object of the present invention to produce the novel compound 2,3-dihydro-9H-isoxazolo-(3,2-b)quinazolin-9-one as well as novel substituted 2,3-dihydro-9H-isoxazolo(3,2-b)quinazolin-9-ones which are useful pharmacologically because of their aforesaid type of activity. Other objects of the invention will be apparent to one skilled in the art, and still other objects will become apparent hereinafter.

The compounds of the present invention are represented by the following general formula:

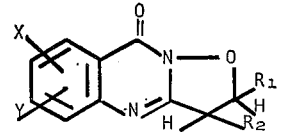

wherein X and Y, which may be the same or different, each represent a member selected from the group consisting of hydrogen, hydroxy, halogen, lower alkyl, lower alkoxy and sulfonamido and $R_1$ and $R_2$, which may be the same or different, represent hydrogen or lower alkyl. As used throughout the instant specification and the appended claims, the terms "lower alkyl" and "lower alkoxy" shall mean alkyl and alkoxy radicals containing from 1 to 6 carbon atoms.

The compounds of the present invention can be prepared in accordance with any one of the following methods:

The following methods of preparation and examples are given by way of illustration only and are in no event to be construed as limiting.

METHOD A

An isatoic anhydride, prepared from an anthranilic acid and phosgene, is allowed to react with the sodium or potassium salt of an appropriate 3-isoxazolidinone, prepared according to known methods, in water or an organic solvent such as dimethylformamide, pyridine, acetonitrile, xylene, chloroform or a mixture of water and an organic solvent, such as described above, according to the following reaction scheme:

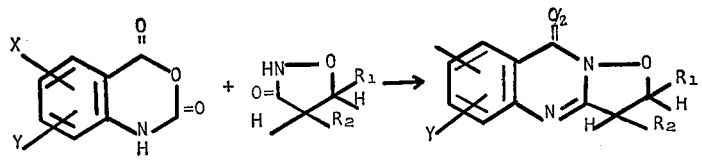

wherein X, Y, $R_1$ and $R_2$ are as hereinbefore defined.

METHOD B

An appropriate 3-isoxazolidinone, prepared from an acid halide of a 3-halogenoalkanoic acid and hydroxylamine in the presence of alkali in water, is reacted in situ with an appropriate isatoic anhydride with or without the addition of an organic solvent, such as employed in Method A, according to a reaction scheme similar to that of Method A.

METHOD C

An ester of a o-(3-chloropropionamido)benzoic acid, such as prepared from an ester of anthranilic acid and an acid halide of a 3-chloroalkanoic acid, is reacted with hydroxylamine in the presence of alkali in water and/or a lower alkyl alcohol according to the following reaction scheme:

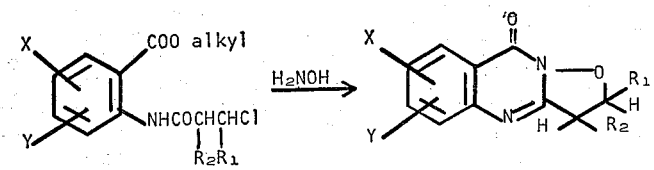

wherein X, Y, $R_1$ and $R_2$ are as hereinbefore defined.

METHOD D

An o-aminobenzohydroxamic acid is reacted with an acid halide of a 3-halogenoalkanoic acid in the presence of alkali in water and/or an alcohol according to the following reaction scheme:

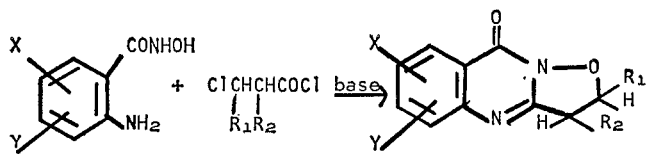

wherein X, Y, $R_1$ and $R_2$ are as hereinbefore defined.

The invention is further illustrated by the following examples.

EXAMPLE I

Preparation of 2,3-dihydro-9H-isoxazolo(3,2-b) quinazolin-9-one

Following the procedure set forth in Method A, a solution of 10 grams of the sodium salt of 3-isoxazolidinone in 200 ml. of water was adjusted to pH 8 with hydrochloric acid and 8.1 grams of isatoic anhydride was added portionwise. The mixture was stirred overnight at room temperature and then extracted with three 100 ml. portions of chloroform. The chloroform solutions were combined, dried, and evaporated to dryness. The crude product (6.4 grams) was recrystallized from xylene giving 4.5 grams of purified 2,3-dihydro-9H-isoxazolo(3,2-b)quinazolin-9-one.

EXAMPLE II 2,3-dihydro-9H-isoxazolo(3,2-b)quinazolin-9-one was prepared using the procedure of Method C above (A) To a cooled solution of 12 grams of methyl anthranilate in pyridine, 10.1 grams of 3-chloropropionyl chloride was added dropwise. The mixture was stirred for two hours with cooling and then evaporated under reduced pressure. The oil was dissolved in chloroform, washed with saturated sodium chloride solution, dried, and evaporated to dryness under reduced pressure. The oil that crystallized on standing was recrystallized first from ethyl ether and then from isopropyl ether. The product, methyl o-(3-chloropropionamido)benzoate melted at 87–90° C. and gave the following analysis: Calculated for $C_{11}H_{12}ClNO_3$ (percent): C, 54.67; H, 5.01; Cl, 14.67; N, 5.80. Found (percent): C, 54.86; H, 5.08; Cl, 14.71; N, 5.78.

(B) To a mixture of ice and water were added 1.6 grams of 50% aqueous solution of sodium hydroxide, 0.7 gram of hydroxylamine hydrochloride and a solution of 2.4 grams of methyl o-(3-chloropropionamido)benzoate in ethanol. The mixture was filtered and the filtrate was concentrated to remove the alcohol. The water solution was extracted with chloroform and the chloroform solution was concentrated by evaporation. The residue was recrystallized from ethyl ether-ethyl acetate to give 2,3-dihydro-9H-isoxazole(3,2-b)quinazolin-9-one.

EXAMPLE III

Preparation of 7-chloro-2,3-dihydro-9H-isoxazolo(3,2-b) quinazolin-9-one

Following the procedure set forth in Method A, a suspension of 8.0 grams of the sodium salt of 3-isoxazolidinone and 15.8 grams of 5-chloroisatoic anhydride in 150 ml. of dimethylformamide was stirred and heated at 80°–90° C. for two hours. The mixture was filtered and the filtrate evaporated to dryness. The residue was dissolved in chloroform and the chloroform solution was washed with water and dried. After evaporation of the solvent, the residue, 7 - chloro - 2,3 - dihydro-9H-isoxazolo(3,2-b) quinazolin-9-one, was recrystallized from ethanol.

EXAMPLE IV

3 - methyl - 2,3 - dihydro-9H-isoxazolo(3,2-b)quinazolin-9-one was prepared following the procedure set forth in Method B above 600 ml. of aqueous solution containing 31.2 grams of sodium hydroxide was cooled at 0° C. and 27.2 grams of hydroxylamine hydrochloride was added. To the resulting solution, 49.3 grams of 3-chloroisobutyryl chloride was added dropwise with cooling and stirring. The mixture was stirred at room temperature for 2 hours. 32 grams of 50% aqueous solution of sodium hydroxide was added, and the mixture was then heated at 65° C. for one hour, allowed to cool to room temperature and treated with 40 grams of isatoic anhydride. Chloroform (200 ml.) was added and the mixture was stirred overnight. The two layers were separated and the aqueous layer was washed with chloroform. The chloroform solutions were combined, dried, and evaporated to dryness leaving 51 grams of an oil. The oil was treated with absolute ethanol containing hydrogen chloride gas and the solid was removed, treated with dilute ammonium hydroxide, and extracted into chloroform. The chloroform solution was washed with a saturated sodium chloride solution, dried, and evaporated to dryness giving 12 grams of 3-methyl-2,3 - dihydro-9H-isoxazolo(3,2-b)quinazolin-9-one having a melting point of 143–146° C.

EXAMPLE V

In accordance with the procedures outlined in Method D above, 3 - methyl-2,3-dihydro-9H-isoxazolo(3,2-b)quinazolin-9-one was prepared as follows To a solution of 3.1 grams of o-aminobenzohydroxamic acid in 50 ml. of pyridine was added dropwise 2.8 grams of 3-chloroisobutyryl chloride and the solution was stirred at room temperature for 16 hours. The pyridine was removed in vacuo and the residue was treated with water and ether and the resulting mixture was adjusted to pH 4. The ether solution was separated, dried and evaporated to dryness. The residue was heated on a steam bath for one-half hour with an aqueous solution containing one equivalent of sodium hydroxide. The mixture was cooled and extracted with chloroform and the chloroform solution was dried and evaporated under reduced pressure. The solid residue was recrystallized from ethyl acetate giving 3-methyl-2,3-dihydro-9H-isoxazolo(3,2-b) quinazolin-9-one, melting point 143–146° C.

EXAMPLE VI

In accordance with the procedures outlined in Method B above, 2 - methyl - 2,3 - dihydro-9H-isoxazolo(3,2-b) quinazolin-9-one was prepared as follows Following the procedure described in Example IV employing 64 grams of 3-chlorobutyryl chloride and 60 grams of isatoic anhydride in lieu of the 49.3 grams of 3-chloroisobutyryl chloride and 40 grams of isatoic anhydride respectively, 29.3 grams of 2-methyl-2,3-dihydro-9H-isoxazolo(3,2-b)quinazolin-9-one was obtained.

The active compounds of the present invention can be used in the free base form or in the form of an acid addition salt thereof with a pharmacologically acceptable acid. As used herein the term "pharmacologically acceptable acids" shall mean organic and inorganic acids such as hydrochloric, phosphoric, sulfuric, citric, acetic, tartaric, and the like.

The following examples illustrate the preparation of acid addition salts useful in the present invention.

EXAMPLE VII

Preparation of 2,3-dihydro-9H-isoxazolo(3,2-b) quinazolin-9-one hydrochloride

A solution of 2,3 - dihydro - 9H-isoxazolo(3,2-b)quinazolin-9-one in methylene chloride was treated with dry hydrogen chloride. The solid thus formed was removed by filtration and recrystallized from ethanol to give 2,3-dihydro - 9H-isoxazolo(3,2-b)-quinazolin-9-one hydrochloride. The product which had a melting point of 195°–210° C. and analyzed as follows: Calculated for $C_{10}H_9ClN_2O_2$ (percent): C, 53.47; H, 4.04; Cl, 15.78; N, 12.47. Found (percent): C, 53.33; H, 3.86; Cl, 15.93; N, 12.25.

EXAMPLE VIII

Preparation of 2,3-dihydro-9H-isoxazolo(3,2-b) quinazolin-9-one phosphate

A solution of 6.2 grams of 2,3-dihydro-9H-isoxazolo(3,2-b)quinazolin-9-one in 300 ml. of isopropanol was heated and treated with 4 grams of 85% phosphoric acid. The mixture was filtered while hot and then cooled. Crystals were removed by filtration and recrystallized from isopropanol giving 6.6 grams of white glistening crystals as product. The product which had a melting point of 210°–213° C., analyzed as follows: Calculated for $C_{10}H_{11}N_2O_6P$ (percent): C, 41.96; H, 3.88; N, 9.79; P, 10.82. Found (percent): C, 41.97; H, 3.86; N, 9.67; P, 10.77.

EXAMPLE IX 2,3 - dihydro - 9H - isoxazol(3,2 - b)quinazolin-9-one sulfate was obtained by recrystallizing from ethanol the solid formed in a mixture of 2,3-dihydro-9H-isoxazolo-(3,2-b)quinazolin-9-one and concentrated sulfuric acid. The 2,3-dihydro-9H-isoxazolo(3,2-b)quinazolin-9-one sulfate had a melting point of 213°–215° C. and analyzed as follows: Calculated for $C_{10}H_{10}N_2O_6S \cdot H_2O$ (percent): C, 39.48; H, 3.98; N, 9.21; S, 10.52. Found (percent): C, 39.61; H, 3.80; N, 9.03; S, 10.48.

The product was dried in vacuo over phosphorus pentoxide at 100° C. The melting point was unchanged and product analysis was as follows: Calculated for $C_{10}H_{10}N_2O_6S$ (percent): C, 41.94; H, 3.52; N, 9.79; S, 11.29. Found (percent): C, 41.14; H, 3.60; N, 9.83; S, 11.03.

EXAMPLE X

The tartrate of 2,3-dihydro-9H-isoxazolo(3,2-b)quinazolin-9-one was obtained as a solid formed in the mixture of 2,3-dihydro-9H-isoxazolo(3,2-b)quinazolin-9-one and tartaric acid in isopropanol. The solid 2,3-dihydro-9H-isoxazolo(3,2-b)quinazolin-9-one tartrate had a melting point of 162°–164° C. and the following analysis: Calculated for $C_{24}H_{22}N_4O_{10}$ (percent): C, 54.76; H, 4.21; N, 10.64. Found (percent): C, 54.66; H, 5.52; N, 10.40.

Table 1, which follows, sets forth the physical constants and analytical values of a number of compounds of the present invention prepared as described in the foregoinng examples as well as additional compounds prepared by substantially similar procedures to those herein specifically described.

Previously underscribed intermediates used to prepare the 2,3 - dihydro-9H-isoxazolo(3,2-b)quinazolin-9-one in Table 1 were 5-methoxyisatoic anhydride and 5-chloro-4-methylisatoic anhydride. These intermediates were prepared according to the following procedures:

(A) 5-methoxyisatoic anhydride 17.3 grams of 5-methoxyanthranilic acid (N. B. Smith et al., J. Am. Chem. Soc., 68: 1301, 1946) was dissolved in a solution of 11 grams of sodium carbonate in 400 ml. of water and was treated with 12 ml. of phosgene. Solid was separated, washed with water and air dried. It weighed 17.2 grams and did not melt up to 280° C. This anhydride was used to prepare Compound 9 of Table 1.

TABLE 1

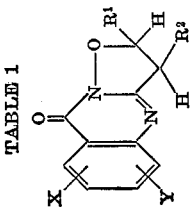

| Compound No. | X | Y | R¹ | R³ | Method | Recryst. solvent | M.P., ° C. | Formula | Carbon Calcd | Carbon Fd | Hydrogen Calcd | Hydrogen Fd | Nitrogen Calcd | Nitrogen Fd | Other elements Calcd | Other elements Fd |
|---|---|---|---|---|---|---|---|---|---|---|---|---|---|---|---|---|
| 1 | H | H | H | H | A, B, C | Xylene or Et₂O-EtOAc | 153-164 | C₁₀H₈N₂O₂ | 63.82 | 63.69 | 4.29 | 4.16 | 14.89 | 14.65 | | |
| 2 | 7-Cl | H | H | H | A | EtOH | 211-218 | C₁₀H₇ClN₂O₂ | 53.95 | 53.77 | 3.16 | 3.00 | 12.58 | 12.36 | ²17.00 | ²15.78 |
| 3 | 5-Cl | 7-Cl | H | CH₃ | B, C, D | Xylene | 199-201 | C₁₀H₆Cl₂N₂O₂ | 46.69 | 46.78 | 2.34 | 2.28 | 10.89 | 10.78 | ²15.92 | ²15.78 |
| 4 | H | H | H | H | A, B | EtOAc | 143-146 | C₁₁H₁₀N₂O₂ | 65.33 | 65.26 | 4.98 | 4.97 | 13.86 | 13.74 | ²27.63 | ²27.52 |
| 5 | 7-CH₃ | H | CH₃ | H | A, B | EtOAc | 214-215-5 | C₁₁H₁₀N₂O₂ | 65.33 | 65.46 | 4.98 | 5.08 | 13.86 | 13.70 | ²15.88 | ²15.93 |
| 6 | H | H | H | H | B, A | Et₂O-CH₃CN | 148-160 | C₁₁H₁₀N₂O₂ | 65.33 | 65.51 | 4.98 | 5.02 | 13.86 | 13.82 | ¹15.83 | ¹15.97 |
| 7 | 6-Cl | H | H | H | A | THF | 226-228 | C₁₀H₇ClN₂O₂ | 53.95 | 53.72 | 3.16 | 3.09 | 12.58 | 12.30 | ²15.92 | ²15.83 |
| 8 | 6-Cl | 7-H₂NSO₂ | H | H | A | EtOH | 273-274 | C₁₀H₈ClN₃O₄S | 39.80 | 39.94 | 2.65 | 2.76 | 13.93 | 13.81 | ¹11.77 | ¹11.81 |
| 9 | 7-CH₃O | H | H | H | A, B | EtOH | 190-195 | C₁₁H₁₀N₂O₃ | 60.54 | 60.28 | 4.62 | 4.52 | 12.84 | 12.62 | ¹22.00 | ¹21.73 |
| 10 | 7-Cl | 6-CH₃ | H | H | A | EtOH | 213-116 | C₁₁H₉ClN₂O₂ | 55.83 | 55.63 | 3.83 | 3.75 | 11.84 | 11.64 | ²14.98 | ²15.05 |

¹ Oxygen.  ² Chlorine.

(B) 5-chloro-4-methylisatoic anhydride 10 grams of 4-methylisatoic anhydride in 300 ml. of acetic acid was treated with 10 grams of sulfuryl chloride. The mixture was heated at about 60° C. for several hours. Solid was removed by filtration, washed with water, and air dried. The solid weighed 11.3 grams and melted with decomposition at 228°–289° C. and analyzed as follows: Calculated for $C_9H_6ClNO_3$ (percent): C, 51.08; H, 2.86; Cl, 16.75; N, 6.62. Found (percent): C, 50.89; H, 2.86; Cl, 16.60; N, 6.59.

This anhydride was used to prepare Compound 10 of Table 1.

One or a mixture of the compounds of the present invention in their free form or as their pharmacologically acceptable acid addition salts can be administered to warm-blooded animals in a variety of unit dosage forms, such as tablets, capsules or injectable solutions. In general, the compounds of the present invention are incorporated with suitable liquid or solid pharmaceutical carriers such as water, propylene glycol, polyethylene glycol, saline, acacia starch, glucose, lactose, sucrose, gelatin, mixtures thereof and the like to form unit dosage forms suitable for administration by injection or for oral administration.

The compounds of the present invention exhibit useful analgesic properties when evaluated in standard laboratory animals by the Randall-Selitto Test, the Haffner Tail Pinch Test and the usual hot plate analgesic test.

The Randall-Selitto procedure is preferred for the purpose of demonstrating the analgesic properties of the compounds of the present invention because it yields more quantative information. The procedure used is based upon the method described by Randall and Selitto, in Arch. Intl. Pharmacodyn., 111: 409, 1957.

Nonfasted male Charles River rats weighing 90 to 130 grams were injected in the right hind paw with 0.1 ml. of 20% brewers' yeast suspension in distilled water. One hour later test drugs were administered orally in such a concentration permitting 0.5 ml. of the drug solution (in 1% acacia) to be given per 100 grams of body weight. The pain threshold was measured one hour after drug administration by applying a steadily increasing pressure of 14 grams per second to the inflammed paw which was continuously monitored by an indicator moving along a linear scale ("Analgesy-Meter," Ugo Basile, Milan, Italy). The rat paw was positioned on a Teflon platform and force applied to the surface via a Teflon cone. The end point or pain threshold was defined as the pressure (in grams) necessary to cause the animals to struggle and/or vocalize.

The data from these experiments were analyzed in the following manner. First, the mean (+S.E.) pain thresholds were calculated for each vehicle and drug-treated group. The percent change (increase or decrease) in mean pain threshold was obtained by dividing the value of the control group into that of the drug-treated group. Secondly, rats in the drug-treated groups were designated as displaying analgesic activity if the individual reaction threshold to pressure equalled or exceeded the control group mean threshold by two standard deviations of that mean (Swingle, et al., Proc. Soc. Exptl. Med., 137:536, 1971). Thus, the results are based on an all-or-none response and $ED_{50}$ values calculated according to the method of Litchfield and Wilcoxon (J. Pharmacol. Exptl. Therap., 96:99, 1949). Table 2, which follows, sets forth the results obtained from an evaluation of a representative number of compound from Table 1.

TABLE 2

| Compound No. | Oral dose, mg./kg. | No. analgesic/ No. tested | Percent increase in pain threshold |
|---|---|---|---|
| | $ED_{50}$=2.4 (1.3-4-6) | | |
| 1 | 0.5 | 0/8 | 0.7 |
| | 1.0 | 4/8 | 25.1 |
| | 2.0 | 4/8 | 57.1 |
| | 4.0 | 4/8 | 39.2 |
| | 8.0 | 7/8 | 45.9 |
| | $ED_{50}$=2.2 (1.0-4.5) | | |
| 4 | 0.75 | 3/8 | 21.2 |
| | 1.5 | 4/8 | 24.5 |
| | 3.0 | 4/8 | 29.2 |
| | 6.25 | 5/8 | 43.3 |
| | 12.5 | 6/8 | 38.2 |
| | 25.0 | 7/8 | 42.9 |
| | $ED_{50}$=5.3 (2.3-12.2) | | |
| 6 | 0.6 | 0/8 | 0.0 |
| | 1.25 | 3/8 | 47.2 |
| | 2.5 | 3/8 | 51.4 |
| | 5.0 | 4/8 | 37.5 |
| | 10.0 | 5/8 | 45.8 |
| | 25.0 | 8/8 | 60.3 |

The foregoing examples and tables have been illustrative of the invention only and are not to be considered as placing any limitation on the invention. It is recognized that various departures may be made therefrom within the scope of the accompanying claims without departing from the principles of the invention.

What is claimed is:

1. A method of relieving pain in a warm-blooded animal which comprises administering systemically to said animal a pharmaceutically effective amount of a compound selected from the group consisting of a compound of the formula.

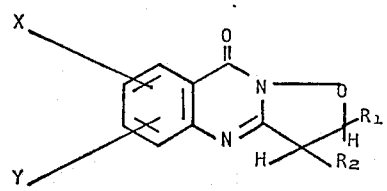

and an acid addition salt thereof in which X and Y, which may be the same or different, each represent a member selected from the group consisting of hydrogen, hydroxy, halogen, lower alkyl, lower alkoxy or sulfonamido and $R_1$ and $R_2$ which may be the same or different are hydrogen or lower alkyl.

2. The method according to claim 1 wherein said compound is 2,3-dihydro-9H-isoxazolo(3,2-b)quinazolin-9-one.

3. The method according to claim 1 wherein said compound is 3-methyl-2,3-dihydro-9H-isoxazolo(3,2-b)quinazolin-9-one.

4. The method according to claim 1 wherein said compound is 2-methyl-2,3-dihydro-9H-isoxazolo(3,2-b)quinazolin-9-one.

References Cited
UNITED STATES PATENTS 3,280,117  10/1966  Griot _____ 260—243

STANLEY J. FRIEDMAN, Primary Examiner